July 2, 1968    R. W. DAVIDSON    3,390,752
CARGO HANDLING APPARATUS
Original Filed July 19, 1963    2 Sheets-Sheet 2
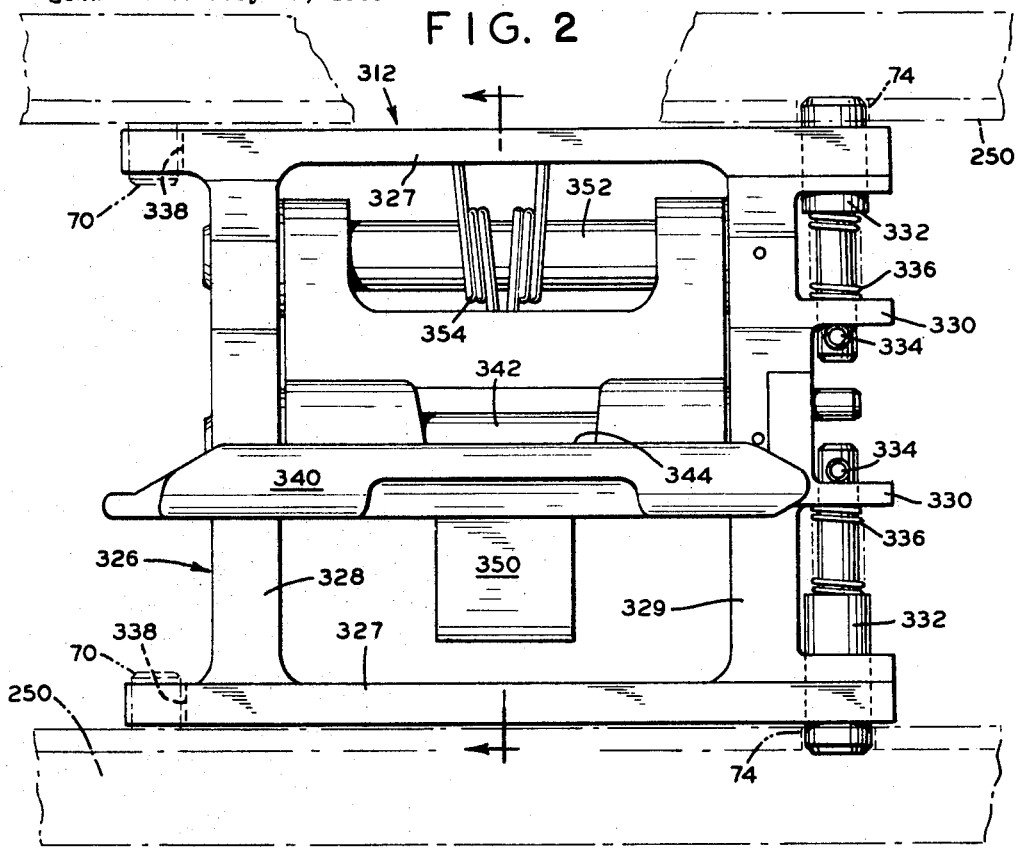
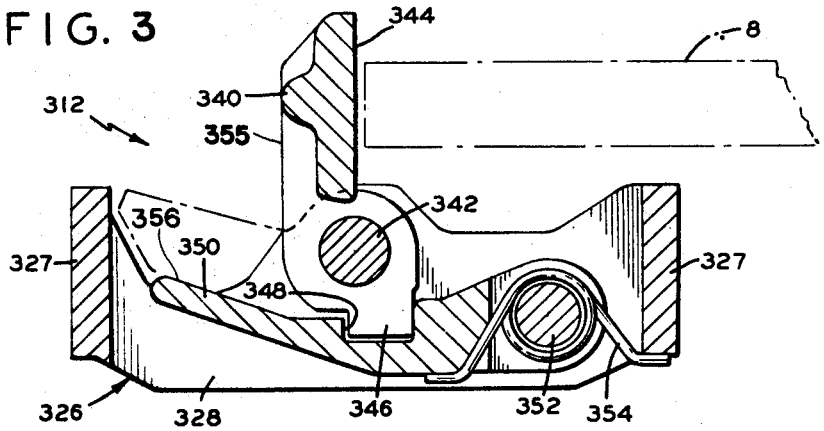
INVENTOR.
ROBERT W. DAVIDSON
BY
ATTORNEY.

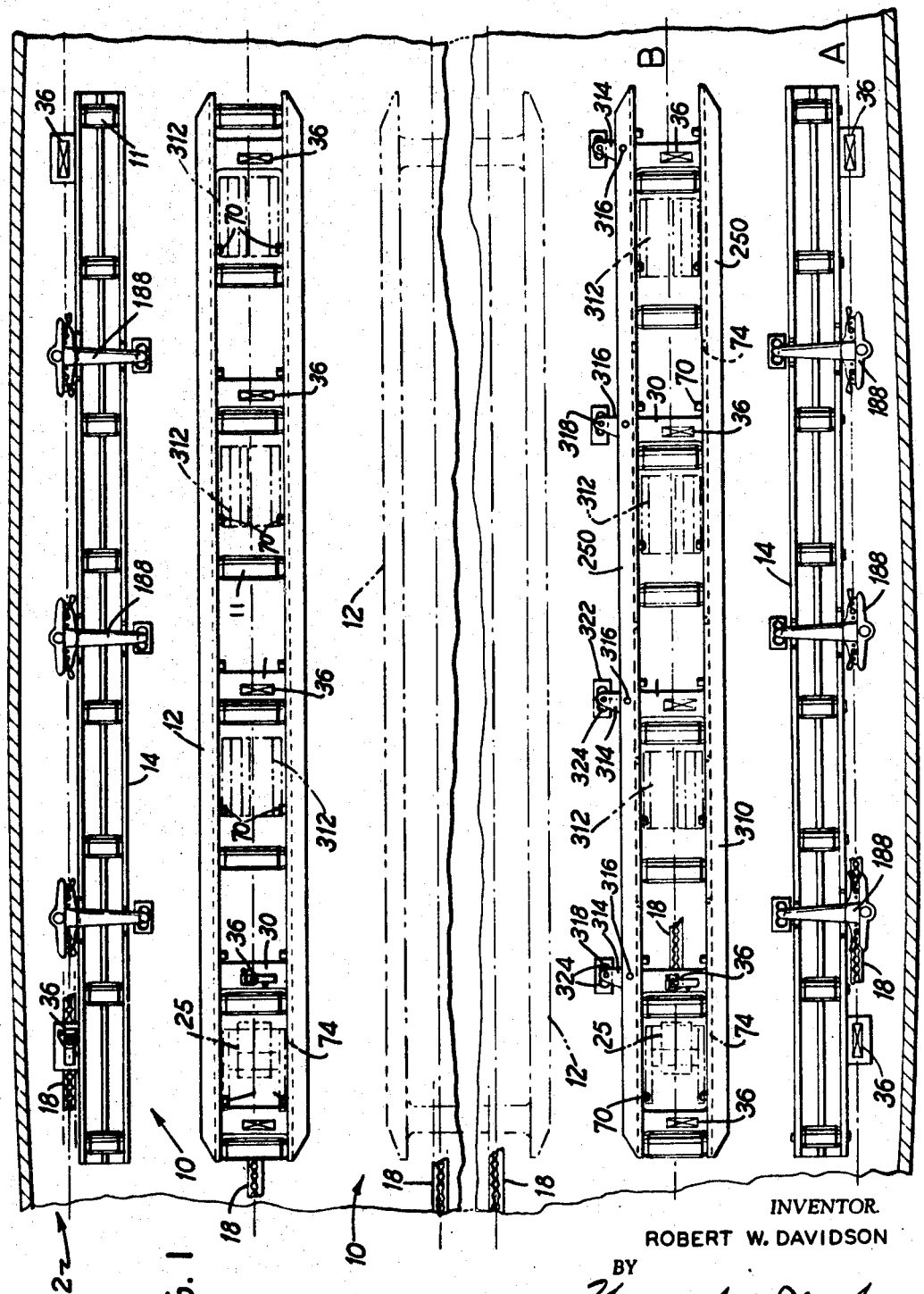

3,390,752
CARGO HANDLING APPARATUS
Robert W. Davidson, York, Pa., assignor to American Machine & Foundry Company, a corporation of New Jersey
Original application July 19, 1963, Ser. No. 296,177. Divided and this application May 16, 1966, Ser. No. 550,490
5 Claims. (Cl. 193—35)

This application relates to cargo handling apparatus and more particularly to mechanism useful in the proper handling of cargo such as loaded pallets or containerized units for transportation in various types of carriers, especially airplanes.

The present invention is a division of my copending application Ser. No. 296,177, filed July 19, 1963, for Cargo Handling Apparatus, to which reference is made for full description and disclosure of the apparatus with which the guiding and restraining mechanism disclosed in this application forms a part. It is to be understood, however, that the novel mechanism disclosed herein can find other uses with other suitable types of cargo handling apparatus.

It is an object of the invention to provide novel guide means for preventing unwanted sidewise movement of palletized cargo in a carrier while being moved into position for transportation.

The invention further consists in the provision of novel restraining mechanism which cooperate with load support mechanism in such manner that loaded pallets or the like of varying sizes supported on such mechanism can be completely restrained against unwanted lateral or sidewise displacement while being transported in a carrier equipped with such transporting mechanism.

With these and other objects not specifically mentioned in view, the invention consists in the novel features pointed out and described more in detail hereinafter, and set forth in the claims hereunto appended.

FIGURE 1 is a plan view disclosing the invention operatively installed in cargo handling system;

FIGURE 2 is a plan view of a preferred form of the invention; and

FIGURE 3 is a sectional view taken on line 3—3 in FIGURE 1.

Referring to the drawings, FIGURE 1 discloses a portion of a carrier, in this case an airplane 2. The airplane is provided with a plurality of elongated tracks designated generally 10, which preferably are detachably secured to the floor thereof. These tracks are provided with longitudinally spaced low friction conveyor rollers 11. Tracks 10 extend longitudinally along the floor of airplane 2 and their length is governed by the amount of space allocated for handling cargo.

Pallets loaded with cargo or containerized units may vary in width as well as length. Therefore, the present invention makes it possible to adapt the cargo handling system shown in FIGURE 1 in such manner that pallets of any selected width will be guided to their predetermined transportation position and therein secured to travel properly without lateral or sidewise displacement.

Tracks 10 comprise a plurality of inner trays 12, 310 and outer trays 14. Although only one inner tray 310 is shown for purposes of illustration, it is to be understood that more can be used if desired, depending upon the width of pallets to be handled by a given system. Trays 12, 14 and 310 can be permanently attached to the floor structure of an airplane or other vehicle. As shown in FIGURE 1, trays 12 and 14 are detachably secured to seat rails 18 extending along the aircraft seat rails indicated in broken lines. Any suitable number of inner trays 12 and 310 can be provided depending upon the width of the airplane. Trays 14 are similarly installed in the aircraft, as are T-shaped guide members 188 of the type and construction disclosed in my copending divisional application Ser. No. 538,257, filed Mar. 29, 1966. The installation shown in FIGURE 1, which has two laterally spaced tracks 10 composed of one or more trays 14, is arranged to handle the widest pallet. This is indicated as position A. Assume that this pallet for position A is 125 inches in width.

Now assume that it is desired to convert system S to one capable of handling pallets, say 108 inches wide. This can be done by using position B, in which case the inner track 10 is composed of one or more trays 310, which trays are essentially the same in construction as a typical tray 12. These trays 310 now become guide trays as well as conveying and locking or holddown trays. The outer or guide tray or trays 14 at position A are not used. It should be apparent that inner tray 310 can be substituted in any one or group of inner tray positions as shown in FIGURE 1 thus providing for a multiplicity of different width pallets or cargo units.

Tray 310 is detachably secured to its respective seat rail 18 by locking fittings 36 mounted in cross members 30 thereof such as described and shown in my copending application Ser. No. 296,177. It will be appreciated that although only one bay is shown in FIGURE 1, the installation of tracks 10 comprising trays 12, 14 and 310 envisions an additional bay or all cargo space available in a carrier. The number of trays forming each track 10 can vary in the same manner as described hereinabove depending upon the width of the carrier and the length of the cargo carrying area.

In tray 310, shown in FIGURE 1, one locking unit 25 of the construction disclosed in my copending application Ser. No. 296,177, is mounted at the extreme left end thereof. This locking unit forms one of a series of transversely aligned locking units 25 detachably mounted in trays 12. Additional locking units 25 can be used, depending upon the length of the tray, and positioning requirements necessary to secure a given pallet 8 against movement. In addition to one locking unit 25, tray 310 also is provided with three auxiliary guide units 312 which are so constructed that, as in the case of the locking dogs of a locking unit 25, their guide arms 340 when in inoperative positions are disposed beneath the operative supporting level of rollers 11 of trays 12, 14 and 310, thereby enabling loaded pallets 8 to be moved to predetermined travel positions in a carrier without interference.

Each guide unit 312 is so constructed that it, like a locking unit 25, can be detachably supported in a tray 310, as in a tray 12. It is preferred to provide additional securing means for tray 310 in order to insure proper lateral support for a pallet bearing against guide arms 340. Referring to FIGURE 1, it will be seen that one channel portion 250 of a tray 310 is provided with a plurality of hold down arms or brackets 314 preferably attached thereto by pins 316 at locations preferably corresponding to the positions of cross members 30. At its free end each bracket 314 supports an adjustable threaded headed tension fitting 318 adapted to engage with the undersides of opposed abutments formed in plates 322 suitably attached to the aircraft. In the installation of each tray 310 which constitute a track 10, fittings 318 are inserted into circular openings 324 of plates 322. The tray is then moved longitudinally until the head of each fitting 318 is disposed beneath the abutments in plates 322.

FIGURES 2 and 3 illustrate a preferred form of auxiliary guide unit 312 which can be detachably mounted on studs 70 and holes 74 in channel portions 250 of each tray 310. The number of units 312 which are used depends upon the size and weight of a load on a pallet, and its length.

Since all auxiliary units 312 are the same, only one need be described in detail. Referring to FIGURES 2 and 3, each unit 312 comprises a frame 326 having side plates 327 joined by integral cross members 328 and 329. The latter is provided with two laterally spaced extensions 330 having bores, which with axially aligned bores in side plates 327, slidably support short shafts 332. The outer ends of shafts 332 project outwardly beyond side plates 327 in order to seat in holes 74 formed in channel portions 250 of trays 310. The inner ends of shafts 332 pass through the bores in extensions 330 and are provided with gripping pins 334 which secure shafts in assembled relationship in each unit 312 and enable a mechanic, when installing or removing a guide unit 312, to press them towards each other against the tension of springs 336 encircling short shafts 332 between plates 327 and extensions 330 in order to retract the free ends of shafts 332 either to withdraw them from holes 74 or allow springs 336 to maintain them seated in holes 74 when a unit 312 is installed. The other ends, as viewed in FIGURE 2, are provided with openings 338 and guide surfaces (not shown), which engage with and are supported on pins 70 in channel portions 250. The method of installing and removing a guide unit 312 is the same as that described in my copending application Ser. No. 296,177 for locking unit 25.

Each auxiliary guide unit 312 is provided with a guide arm 340 pivotally mounted on shaft 342 supported in cross members 328 and 329. Arm 340 is provided with a flat guide face 344 which not only guides a pallet 8 but also provides a lateral support against which a pallet positioned between guides 188 and guide units 312 can press. Arm 340 also is formed with a latch nose 346 which coacts with a complementary locking groove 348 formed in a latch lever 350 pivotally mounted on shaft 352 supported by cross members 328, 329 and a cam surface 355 for coaction with latch 350. A torsion spring 354 encircling shaft 352 and having one end bearing against the underside of one of side plates 327 and its other end pressing against the underside of lever 350 braces lever 350 with locking relationship with nose 346. This coaction maintains arm 346 in its guiding position as shown n FIGURE 3. Latch 350 is provided with an extension 356 formed to coact with the rearward cam surface 355 of arm 340 such that arm 340 is securely stowed in inoperative position below the operative plane of the rollers against forces generated by the carrier while in motion and against inadvertent restoration to upright operative position where it would impede the movement of a pallet or container of a wider dimension than that for which the guide unit is intended.

I claim:

1. A restraining and guiding unit adapted to be mounted on a selected inner tray of a cargo handling apparatus, which comprises: a frame having sidewalls, a pivotally mounted guiding and restraining arm mounted in said frame, and extending in parallel relationship with the sidewalls of said frame, a latch member formed on said arm, a pivotally mounted latch lever carried on said frame, said latch lever being provided with a locking portion, spring means normally biasing said latch lever into engagement with said locking member on said arm whereby, when said lock member and said portion of said locking lever are engaged, said arm is disposed in position to act as a side guide to prevent substantial parallel movement of a cargo unit bearing against said arm, and means for detachably mounting said restraining and guiding unit on a selected inner tray.

2. The unit defined in claim 1, wherein said last named means comprise slidably mounted short shafts supported in a cross frame member forming a part of said frame, springs normally biasing said short shafts into operative position, and operating means attached to said shafts for retracting said short shafts whereby the free ends thereof may be positioned for engagement with support holes in said tray.

3. The unit defined in claim 1 including means for mounting said arm for positioning in inoperative condition beneath the operative plane of said frame.

4. The unit defined in claim 1 wherein said unit connects with cargo handling apparatus including elongated trays having rollers thereon, and means mounting said guiding and restraining arm for movement from an inoperative position below the plane of said rollers of said trays to an operative position above said rollers.

5. The invention defined in claim 4 including means for holding said arm in its operative position above said rollers.

References Cited

UNITED STATES PATENTS 3,225,942   12/1965   Fossenier _____ 214—6

ALBERT J. MAKAY, *Primary Examiner.*